Patented Aug. 12, 1941

2,251,940

UNITED STATES PATENT OFFICE 2,251,940

SULPHONIC DERIVATIVES

Morris Katzman, Chicago, Ill., assignor to The Emulsol Corporation, Chicago, Ill., a corporation of Illinois No Drawing. Application July 7, 1939,
Serial No. 283,141

20 Claims. (Cl. 260—401)

This invention relates to new chemical compounds in the form of sulphonic derivatives which are characterized by possessing interface modifying properties rendering the same highly useful for the purposes for which such agents are employed in the various arts. The invention also relates to novel intermediate compounds having utility for divers purposes.

The substances of the invention are, in general, higher molecular weight esters or ethers of aliphatic sulpho-poly-carboxylic acid amides of alcohol- or alkylol-primary or secondary amines. More particularly, and as exemplified by the preferred embodiments of the invention, they are higher molecular weight fatty acid esters of lower molecular weight aliphatic sulpho-dicarboxylic acid amides of monohydroxy alkylolamines.

At least most of the novel sulphonic compounds fall within the scope of the general formula RO—(alk—NY)$_m$—CO—Z wherein R is an organic radical containing at least four carbon atoms, alk stands for hydrocarbon, for example, alkylene, or arylene such as ethylene or phenylene, Y is hydrogen, alkyl, cycloalkyl, alkoxyl, aralkyl, aryl, or alkylol, —CO—Z is the carboxylic acyl radical of an aliphatic sulpho-poly-carboxylic acid containing preferably less than eight carbon atoms, and $m$ is a whole number, preferably from one to four.

A more limited aspect of the compounds of the invention may be represented by the general formula

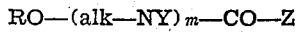

wherein R is a hydrocarbon radical or substituted hydrocarbon radical containing at least seven and preferably from eleven to seventeen carbon atoms, and M and M' are cations.

The radical R in the above formulae may be of aliphatic, cycloaliphatic, aromatic or aromatic-aliphatic character, and may contain substituent groups such as amino, hydroxy, halogen, sulphate, sulphonic, phosphate, carboxyl, nitrile, and the like, as will be pointed out hereinafter, but it is particularly preferred that it be unsubstituted aliphatic or fatty and contain upwards of ten carbon atoms to about eighteen carbon atoms. Alk, likewise, may contain substituent groups such as amino, hydroxy, halogen, sulphate, sulphonic, phosphate, carboxyl, nitrile, and the like, and the sequence of carbon atoms therein may be interrupted by O, S, C=O, NH, NR, where R is alkyl, and the like.

In order that the nature of the invention may become apparent, there are listed hereinbelow representative compounds which fall within the scope of the invention:

(1) C$_{11}$H$_{23}$—C—O—CH$_2$—CH$_2$—NH—CO—CH$_2$—CH—COONa
     ‖                                              |
     O                                              SO$_3$Na (2) C$_{17}$H$_{35}$—C—O—CH$_2$—CH$_2$—NH—CO—CH$_2$—CH—COOK
     ‖                                              |
     O                                              SO$_3$K (3) C$_{13}$H$_{27}$—C—O—CH$_2$—CH$_2$—NH—CO—CH$_2$—CH$_2$—CH—COONH$_4$
     ‖                                                      |
     O                                                      SO$_3$NH$_4$ (4) C$_7$H$_{15}$—C—O—CH$_2$—CH$_2$—NH—CO—CH$_2$—CH—COOH.N≡(C$_2$H$_4$OH)$_3$
     ‖                                              |
     O                                              SO$_3$H.N≡(C$_2$H$_4$OH)$_3$ (5) C$_{17}$H$_{35}$—C—O—CH$_2$—CH—CH$_2$—NH—CO—CH$_2$—CH—COOK
     ‖                  |                           |
     O                  OH                          SO$_3$K (6) C$_{12}$H$_{25}$—O—CH$_2$—CH$_2$—NH—CO—CH$_2$—CH—COOK
                                              |
                                              SO$_3$K (7) C$_{11}$H$_{23}$—C—O—CH$_2$—CH$_2$—CH$_2$—NH—CO—CH$_2$—CH—COONa
     ‖                                                     |
     O                                                     SO$_3$Na (8) C$_{19}$H$_{29}$—C—O—CH$_2$—CH$_2$—NH—CO—CH$_2$—CH—COONH$_4$
     ‖                                              |
     O                                              SO$_3$NH$_4$ (9)                         O
    CH$_3$—(CH$_2$)$_9$—CH—C—O—CH$_2$—CH$_2$—NH—CO—CH$_2$—CH—COONa
                      |                                     |
                      OH                                    SO$_3$Na (10)

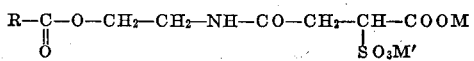

(11) 
<Ph>—C—O—CH$_2$—CH$_2$—NH—CO—CH$_2$—CH—COOK
     ‖                                    |
     O                                    SO$_3$K

(12) H$_2$C—CH$_2$
     H$_2$C    CH—C—O—CH$_2$—CH$_2$—NH—CO—CH$_2$—CH—COONa
     H$_2$C—CH$_2$  ‖                                    |
                    O                                    SO$_3$Na

(13) C$_{11}$H$_{23}$—C—O—CH$_2$—CH$_2$—NH—CO—CH$_2$(CH$_2$)$_5$—CH—CH$_2$—COOK
      ‖                                                          |
      O                                                          SO$_3$K

(14) C$_{13}$H$_{27}$—C—O—CH$_2$—CH$_2$—NH—CO—CH—SO$_3$H.NH=(C$_2$H$_4$OH)$_2$
      ‖                                  |
      O                                  COOH.NH=(C$_2$H$_4$OH)$_2$

(15) C$_{16}$H$_{33}$—O—CH$_2$—CH$_2$—NH—CO—CH$_2$—CH—COOK
                                              |
                                              SO$_3$K

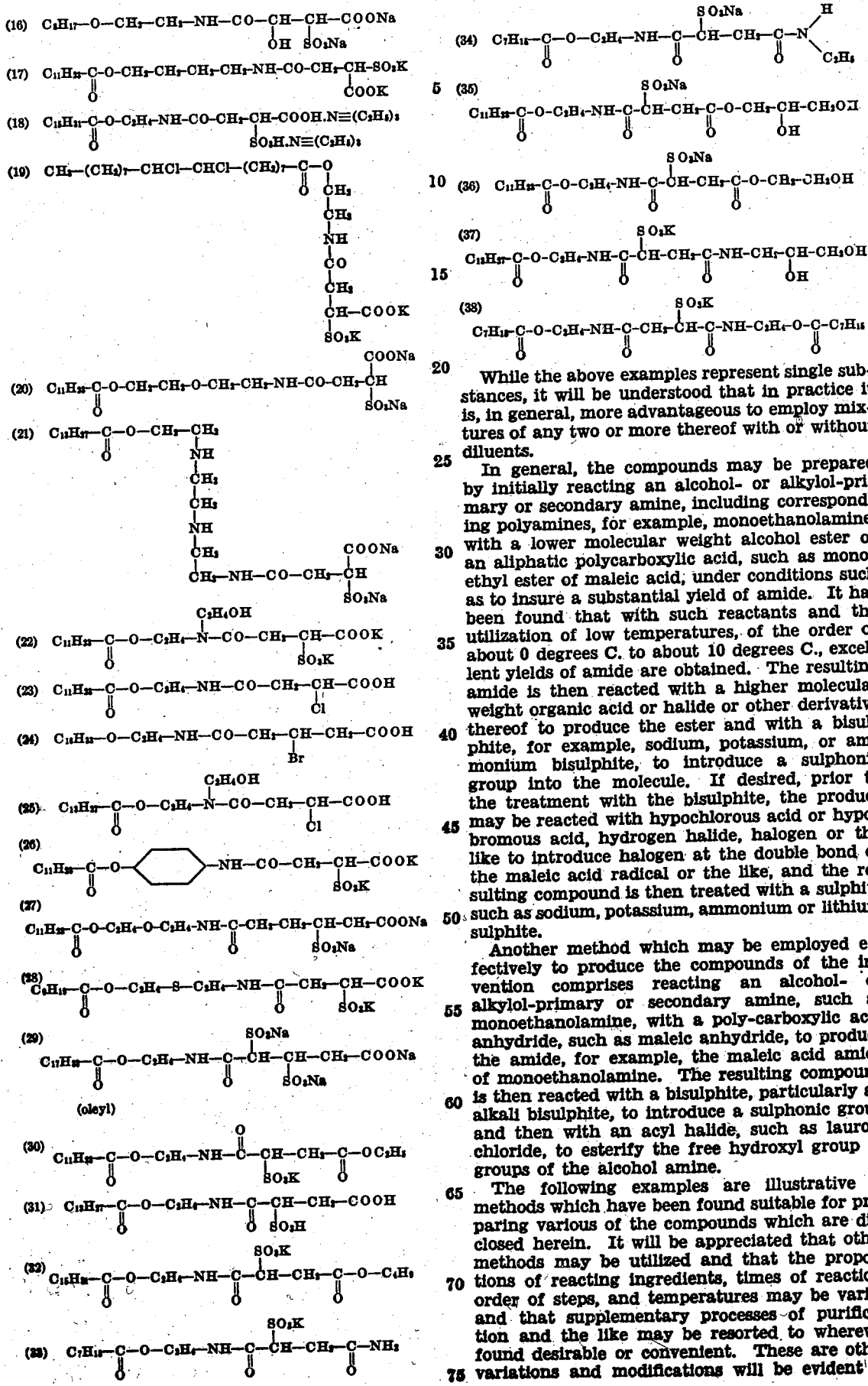

While the above examples represent single substances, it will be understood that in practice it is, in general, more advantageous to employ mixtures of any two or more thereof with or without diluents.

In general, the compounds may be prepared by initially reacting an alcohol- or alkylol-primary or secondary amine, including corresponding polyamines, for example, monoethanolamine, with a lower molecular weight alcohol ester of an aliphatic polycarboxylic acid, such as monoethyl ester of maleic acid, under conditions such as to insure a substantial yield of amide. It has been found that with such reactants and the utilization of low temperatures, of the order of about 0 degrees C. to about 10 degrees C., excellent yields of amide are obtained. The resulting amide is then reacted with a higher molecular weight organic acid or halide or other derivative thereof to produce the ester and with a bisulphite, for example, sodium, potassium, or ammonium bisulphite, to introduce a sulphonic group into the molecule. If desired, prior to the treatment with the bisulphite, the product may be reacted with hypochlorous acid or hypobromous acid, hydrogen halide, halogen or the like to introduce halogen at the double bond of the maleic acid radical or the like, and the resulting compound is then treated with a sulphite such as sodium, potassium, ammonium or lithium sulphite.

Another method which may be employed effectively to produce the compounds of the invention comprises reacting an alcohol- or alkylol-primary or secondary amine, such as monoethanolamine, with a poly-carboxylic acid anhydride, such as maleic anhydride, to produce the amide, for example, the maleic acid amide of monoethanolamine. The resulting compound is then reacted with a bisulphite, particularly an alkali bisulphite, to introduce a sulphonic group and then with an acyl halide, such as lauroyl chloride, to esterify the free hydroxyl group or groups of the alcohol amine.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and the like may be resorted to wherever found desirable or convenient. These are other variations and modifications will be evident to

Example A 6.1 grams of monoethanolamine were dissolved in 25 cc. of dry dioxane and this solution was added slowly, with constant stirring, to 10 grams of maleic anhydride. The temperature rose to 70 degrees C. over a period of about 10 minutes. The resulting clear solution was then cooled to 40 degrees C. and 20 cc. of lauroyl chloride were added dropwise over a period of about 5 minutes. The temperature rose to approximately 60 degrees C. and the mixture became homogeneous. It was then heated to 80 degrees C. and maintained at such temperature for about 5 minutes.

To the resulting reaction product, 50 cc. of water and 25 grams of potassium bisulphite were added and the mixture was heated, with stirring, for about 10 minutes at 60 degrees C. The product became a jelly-like liquid having good foaming and wetting properties.

In order to purify the product, 20 grams of the reaction mass were extracted with 120 cc. of boiling isopropyl alcohol, the solution was then cooled down and filtered and the residue, which was a white solid and possessed good water solubility and foaming properties, comprised essentially a product having the following probable formula:

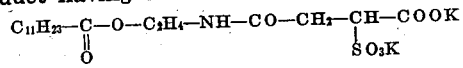

Example B 10.5 grams of diethanolamine were dissolved in 15 cc. of pyridine and there were added thereto 10 grams of maleic anhydride dissolved in 15 cc. of pyridine. The temperature rose from 25 degrees C. to approximately 40 degrees C. in a period of about 10 minutes. The mass was then cooled to 20 degrees C. and, over a period of 10 minutes, 20 grams of lauroyl chloride were added dropwise, the reaction mass being maintained on the cold water bath. During the reaction of the lauroyl chloride, there was added, dropwise, a solution of 12 grams of sodium hydroxide and 100 cc. of ethyl alcohol. The precipitated sodium chloride was filtered off and the solution was evaporated in vacuo on a hot water bath. To the residue, 40 cc. of water and 20 grams of sodium bisulphite were added and the mixture heated, with stirring, for a period of 30 minutes at a temperature between 60 degrees C. and 70 degrees C. The reaction product, which comprised a solution having foaming and wetting properties, contained a substantial proportion of a compound having the following probable formula:

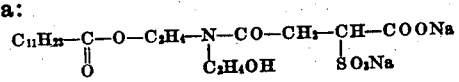

Example C 13.7 grams of phenyl ethanolamine and 11 grams of maleic anhydride were mixed together at room temperature, the temperature spontaneously rising to approximately 70 degrees C. The reaction mass was then heated to 100 degrees C. and maintained at that temperature for about 5 minutes. While still at approximately 100 degrees C., 20 cc. of lauroyl chloride were added dropwise thereto, with stirring, over a period of about 10 minutes, the temperature during the reaction being maintained at about 90 degrees C. to 95 degrees C.

10 grams of the resulting liquid reaction mixture, 10 grams of sodium bisulphite and 25 cc. of water were heated, with stirring, to 60 degrees C. and maintained at that temperature for between 15 minutes and 20 minutes. The resulting reaction product, which had good foaming and wetting properties, contained a substantial proportion of a compound having the following probable formula:

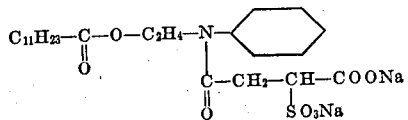

If desired, the reaction mass may be evaporated down and the desired product obtained in purified form by extraction of extraneous matter or unreacted materials with organic solvents.

Example D (1) 10.4 grams of hydroxyethyl ethylene diamine were dissolved in 50 cc. of water and 19.6 grams of maleic anhydride were slowly added thereto, with stirring. Simultaneously with the addition of the maleic anhydride, a solution comprising 14 grams of potassium hydroxide dissolved in 50 cc. of water was added dropwise, with constant stirring, over a period of about 20 minutes. The resulting solution, which was just faintly alkaline to phenolphthalein, was evaporated to dryness in an oven at a temperature of about 150 degrees C. over a period of about 2 hours. The dried product was then cooled and ground to a powder.

(2) 17 grams of the product produced in part (1) hereof and 10 cc. of lauroyl chloride were mixed together and heated on the boiling water bath for 30 minutes, a vacuum being employed to draw off the hydrochloric acid as it was formed in the reaction. The resulting reaction mass was then washed twice, in each instance 100 cc. of petroleum ether being employed to extract the fatty matter. The residue, from which the adhering petroleum ether was removed by warming, was then dried and powdered.

(3) 10 grams of the dried powder produced in part (2) hereof, 10 grams of potassium meta bisulphite, and 20 cc. of water were mixed together and heated at 60 degrees C., with constant stirring, for about 10 minutes. The resulting solution was then cooled to room temperature and 5 cc. of a 30% aqueous solution of potassium hydroxide were added thereto to neutralize the solution to litmus. The resulting solution possessed good foaming and wetting properties and contained a substantial proportion of a compound having the following probable formula:

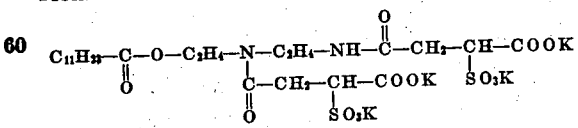

If desired, the excess sulphite present may be destroyed by oxidation, for example, by means of hydrogen peroxide or the like. The product may be obtained in more concentrated form, if desired, by evaporation of the solution to dryness and the extraction of extraneous matter by the usual organic solvents.

Example E (1) 17.5 grams of mono-ethyl ester of maleic acid and 12.3 grams of monoethanolamine were mixed together, the temperature spontaneously rising to 65 degrees C. The resulting product was then heated at 190 degrees C. for 20 to 30 minutes, approximately two equivalents of ethyl alcohol being volatilized. The reaction mass was cooled to 60 degrees C. and 40 grams of lauroyl chloride were added dropwise, with stirring, over a period of about 15 minutes, the mass then being allowed to stand for one hour at 60 degrees C.–70 degrees C.

(2) 10 grams of the reaction product produced in part (1) hereof, 10 grams of sodium bisulphite, and 20 cc. of water were mixed together and heated for several hours, with stirring, at 70 degrees C.–80 degrees C. The final reaction product, which was soluble and possessed foaming properties, contained a substantial proportion of a compound having the following probable formula:

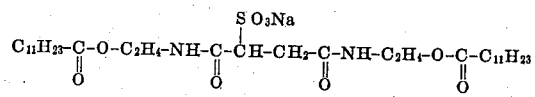

In certain instances, as indicated, by way of illustration, in Example 31, a free carboxyl group may be present in the compounds. Such compounds may be further reacted to esterify or amidify the free carboxyl group to convert the same into the groups —CONH$_2$, —CONHR, and —COOR where R is preferably lower molecular weight alkyl or cyclo-alkyl such as ethyl, butyl, cyclohexyl and the like, which may contain substituent groups such as halogen, hydroxy, amino, cyanogen and the like. In the case of the ester linkage, that is, the —COOR group, the radical R may be that of a polyhydric alcohol or polyhydroxy substance such as glycerol, glycols and polyglycols such as ethylene glycol, propylene glycol, butylene glycol, diethylene glycol, polyglycerols, and the like. Such derivatives have particularly desirable properties in the industrial and technical arts. The usual amidification and esterification procedures can readily be adapted by the skilled chemist to the preparation of such derivatives.

Instead of carrying out the reactions as described hereinabove, various of the compounds of this invention may be produced by reacting an amino alkyl ester with a sulpho-poly-carboxylic acid or ester of a sulpho-poly-carboxylic acyl halide in accordance, for example, with the following reaction:

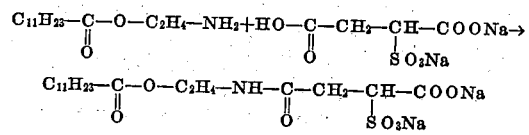

It will be understood, particularly in the light of the examples hereinabove, that the novel compounds of the present invention may contain one or more imino or like linkages. Thus, for example, in place of employing monoethanolamine or monopropanolamine or the like as a starting material, compounds may be utilized having a plurality of imino groups such as the following, by way of illustration:

(a) HO—CH$_2$—CH$_2$—NH—CH$_2$—CH$_2$—NH—CH$_2$—CH$_2$—NH$_2$ (b) HO—CH$_2$—CH$_2$—CH$_2$—NH—CH$_2$—CH$_2$—CH$_2$—NH—CH$_2$—CH$_2$—CH$_2$—NH$_2$ (c) HO—(CH$_2$—CH—CH$_2$—NH)$_n$—CH$_2$—CH—CH$_2$—NH$_2$
            |                              |
            OH                             OH ($n$ is a small whole number such as 1, 2 or 3.)

As Examples 6, 15 and 16 show, the compounds may also comprise higher molecular weight ether derivatives. The higher molecular weight ethers may be prepared, for example, by reacting a compound containing a reactive halogen, for example,

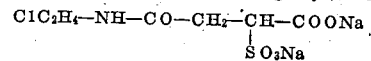

with an alkali metal alcoholate such as sodium laurylate (C$_{12}$H$_{25}$—ONa) in accordance with general methods known in the art. In general, the higher molecular weight esters are more satisfactory for most purposes.

The organic radical represented by R in the general formulae may, as stated, be derived from various sources. Among such sources may be mentioned straight chain and branched chain carboxylic, aliphatic, and fatty acids, saturated and unsaturated, such as butyric acid, capyrylic acid, caproic acid, capric acid, sebacic acid, behenic acid, arachidic acid, cerotic acid, erucic acid, melissic acid, stearic acid, oleic acid, recinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil, partially or completely hydrogenated animal and vegetable oils such as those mentioned; oxidized and/or polymerized higher fatty acids or higher fatty acids derived from oxidized and/or polymerized triglyceride oils; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; fatty acids derived from various waxes such as beeswax, spermaceti, montan wax, and carnauba wax and carboxylic acids derived, by oxidation and other methods, from petroleum; cycloaliphatic and hydroaromatic acids such as hexahydrobenzoic acid, resinic acids, naphthenic acid and abietic acid; aromatic acids such as phthalic acid, benzoic acid, naphthoic acid, pyridine carboxylic acids; hydroxy aromatic acids such as salicyclic acid, hydroxy benzoic and naphthoic acids, and the like; and substitution and addition derivatives, particularly halogen substitution and addition derivatives of the aforementioned carboxylic substances. It will be understood that mixtures of any two or more of said acids may be employed if desired.

In those cases where ethers are prepared, the higher molecular weight organic radical is derived from alcoholates of alcohols corresponding to the higher molecular weight acids referred to hereinabove.

The aliphatic sulpho-poly-carboxylic acid radicals present in the compounds of my invention may be selected from a relatively large class including, for example, those of sulpho-succinic acid, sulpho-glutaric acid, and similar sulphonic derivatives of malonic acid, citraconic acid, mesaconic acid, itaconic acid, mucic acid, adipic acid, pimelic acid, sebacic acid, suberic acid, azelaic acid, aconitic acid, and the like. The sulphopoly-carboxylic acid radicals may, in certain instances, contain substituent groups such as halogen, amino, cyanogen, hydroxy and the like but, in general, the best results are obtained when the sulpho-polycarboxylic acid radical is otherwise unsubstituted.

Where the products are produced by reaction of amides of unsaturated aliphatic polycarboxylic acids followed by introduction of the sulphonic group by means of an alkali sulphite or bisulphite, the unsaturated polycarboxylic acids or derivatives thereof which may be utilized include, by way of example, maleic acid, fumaric acid, maleic acid anhydride, and the like. These and other derivatives may also be produced by initially preparing the aliphatic sulpho-polycarboxylic acid or its anhydride, for example, sulpho-maleic acid or the anhydride thereof, and the same may be reacted with monoethanolamine to form the amide and then with an acyl halide, such as octoyl chloride or lauroyl chloride, to produce an ester of the amide.

The alcohol- or alkylol-primary and secondary amines which are reacted with the maleic acid anhydride or the like to produce the amide derivatives include, among others, by way of example, monoethanolamine, diethanolamine, monopropanolamine, dipropanolamine, monoethyl ethanolamine, mono-butyl ethanolamine, monobutanolamine, mono-iso-butanolamine, dibutanolamine, monopentanolamine, dipentanolamine, mono-hexanolamine, dihexanolamine,

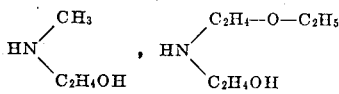

mono-cyclohexyl, beta-hydroxy-ethyl amine; ethanol aniline; 1-amino-propanediol-2,3; mono-decylolamine, mono-laurylol-amine, mono-hexadecylolamine, mono-octadecylolamine; mono- and di-hydroxy polyamines derived, for example, from ethylene diamine, diethylene triamine, triethylene tetra-amine; mono- and polyamines of sugars and sugar alcohols such as dextrose, sucrose, sorbitol, mannitol and dulcitol, and amines of polyhydric alcohols in general such as glycerol mono- and di-amine; cyclic hydroxy amines including, for example, p-amino phenol,

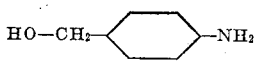

and the like.

In the event that the sulphonic compounds of the present invention are made by reacting the halogen derivatives with an alkali sulphite or other soluble sulphites as well as thiosulphates, the corresponding alkali sulphonic acid derivative is produced. When prepared by other methods, other sulphonic acid salts may be produced or the alkali sulphonates can be converted into other salts by methods such as described in the application of Benjamin R. Harris, Serial No. 190,136, filed February 11, 1938, now Patent No. 2,166,144, issued July 18, 1939. Thus, the cation represented by M in the general formula set forth hereinabove may be calcium, magnesium, aluminum, zinc, organic nitrogenous bases as, for example, alcohol amines and alkylol-, arylol- and aralkylol amines including mono, di- and tri-ethanolamine and mixtures thereof such as are, for example, present in so-called commercial triethanolamine, propanolamines, butanolamines, pentanolamines, hexanolamines, glycerolamines, glucamines, dibutyl ethanolamine, diethanol ethyl amine, cyclohexyl ethanolamine, diethanol cyclohexylamine, ethanol aniline, alkylol polyamines such as alkylol derivatives of ethylene diamine, mono-methyl monoethanolamine, diethyl-monoethanolamine, 1-amino-2,3 propanediol, 1, 2-diaminopropanol; alkylamines such as butyl amine, hexylamine, dimethylamine, ethylene diamine, diethylene triamine, triethylene tetra-amine, mono-methyl ethylene diamine, mono-ethyl diethylene tetra-amine, mono-allyl amine, aromatic and heterocyclic bases such as benzylamine, cyclo-hexylethyl-aniline, morpholine, pyridine, alkyl pyridines such as methylpyridine, piperidine, pyrrolidines, quinolines, quinaldine, nicotine, and homologues and derivatives or substitution products thereof; mixtures of any two or more thereof, and the like. It will be understood that these organic bases, as in the case of triethanolamine, for example, may be employed in pure, impure, or commercial form.

Instead of reacting the halogeno-poly-carboxylic acid amide of the alcohol primary or secondary amine, for example,

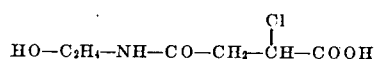

with an alkali sulphite and an acyl halide, as described hereinabove, the intermediate may be reacted with a salt of a higher molecular weight carboxylic acid or the like, such as sodium stearate, potassium laurate, sodium caprylate or the like, which will introduce an ester linkage into the molecule at the halogen portion of the molecule. The resulting compound may then be reacted to introduce a hydrophilic group into the molecule such as a sulphate, phosphate, pyrophosphate, tetraphosphate, or other hydrophilic group. In other words, the configuration of the resulting compounds is such that the lipophilic and hydrophilic groups are at the opposite ends, respectively, of the location of such groups in the previously described compounds. An illustrative compound of the type under discussion may be represented by the following formula:

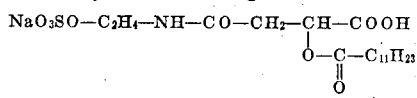

Those skilled in the art will know, in the light of my teachings herein, the manner of preparing compounds of this type.

The compounds of this invention have utility in various arts in which interface modifying agents are employed. Many of them are resistant to precipitation by calcium and magnesium salts and are compatible with acid and alkali media. Various of them may be utilized in washing and laundering and in the textile and related industries wherein they function for softening, wetting, detergent, emulsifying, penetrating, dispersing, frothing, and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles, many of them may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic cream such as cold creams, vanishing creams, tissue creams, shaving creams of the brushless and lathering type and similar cosmetic preparations. Another use to which various of the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil-field operations, and for various other purposes which will readily occur to those versed in the art in the light of the disclosure herein.

As detergents, many of them may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates, including pyrophosphates and tetraphosphates, sodium sulpate, alums, perborates such as sodium perborate, and the like. They may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphate, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl postassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-red oils; compounds of the type of isopropyl naphthalene sodium sulphonate, and other classes of wetting agents.

It will be understood that, in all cases, there is present in the molecules of the sulphonic derivatives of the present invention at least one sulphonic acid radical although, depending upon the particular reacting ingredients and the proportions thereof utilized, more than one sulphonic group may be introduced.

Wherever the term "higher" is employed as referring to higher molecular weight organic acids or the like, it will be understood to cover compounds or radicals having at least eight carbon atoms unless otherwise specifically stated.

Whenever the term sulphonic group, sulphonic radical, sulphonic acid group, or the like expression is employed in the claims, it will be understood to cover the compounds irrespective of whether the hydrogen of the sulphonic acid radical is present as such or replaced by another cation, unless the connotation otherwise expressly indicates differently. The same is true with respect to the carboxyl group or groups the hydrogen of which may or may not be replaced with other cations.

The present application is a continuation-in-part of application, Serial No. 219,358, filed July 15, 1938, now Patent No. 2,184,770, issued December 26, 1939.

What I claim as new and desire to protect by Letters Patent of the United States is:

1. Chemical compounds corresponding to the general formula $$R-O-(alk-NY)_m-CO-Z$$

wherein R is a member selected from the group consisting of acyl, alkyl and substituted alkyl radicals containing at least four carbon atoms, alk is a member selected from the group consisting of hydrocarbon radicals and substitution products thereof, Y is a member selected from the group consisting of hydrogen, alkyl, cycloalkyl, alkoxyl, aralkyl, aryl, and alkylol, —CO—Z is the carboxylic acyl radical of an aliphatic sulpho-polycarboxylic acid, and $m$ is a whole number.

2. Chemical compounds corresponding to the general formula

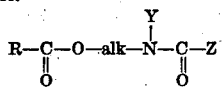

wherein R—C=O is an aliphatic acyl radical containing at least eight carbon atoms, alk is a hydrocarbon radical, Y is a member selected from the group consisting of hydrogen, alkyl, cycloalkyl, alkoxyl, aralkyl, aryl, and alkylol, and

is the carboxylic acyl radical of an aliphatic sulpho-poly-carboxylic acid containing not more than eight carbon atoms.

3. Chemical compounds corresponding to the general formula

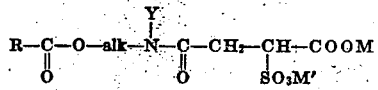

wherein R—C=O is an aliphatic acyl radical containing at least eight carbon atoms, alk is alkylene, Y is a member selected from the group consisting of hydrogen, alkyl, cycloalkyl, alkoxyl, aralkyl, aryl, and alkylol, and M and M' are cations.

4. Chemical compounds corresponding to the general formula

RO—(alk—NY)$_m$—CO—Z wherein R is a member selected from the group consisting of acyl, alkyl and substituted alkyl radicals containing at least four carbon atoms, alk is hydrocarbon, Y is a member selected from the group consisting of hydrogen, alkyl, cycloalkyl, alkoxyl, aralkyl, aryl, and alkylol, $m$ is a whole number, and —CO—Z is the carboxylic acyl radical of an aliphatic sulpho-polycarboxylic acid.

5. Chemical compounds corresponding to the general formula

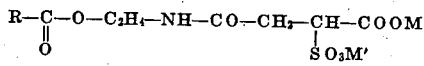

wherein R—C=O is an acyl radical containing at least four carbon atoms, and M and M' are cations.

6. Chemical compounds corresponding to the general formula

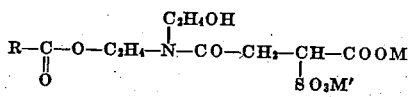

wherein R—C=O is an acyl radical containing at least four carbon atoms, and M and M' are cations.

7. Chemical compounds corresponding to the general formula

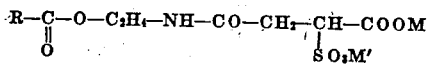

wherein R—C=O is a fatty acid acyl radical containing from eight to eighteen carbon atoms, and M and M' are cations.

8. Chemical compounds corresponding to the formula

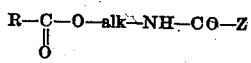

wherein R—C=O is an aliphatic acyl radical containing at least eight carbon atoms, alk is alkylene, and —CO—Z is the carboxylic acyl radical of an aliphatic sulpho-dicarboxylic acid containing not more than eight carbon atoms.

9. Chemical compounds corresponding to the formula

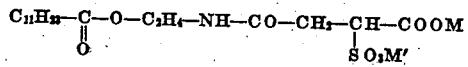

wherein M and M' are alkali metals.

10. The process of preparing chemical compounds which comprises reacting an aliphatic poly-carboxylic acid amide of an alcohol amine with a member selected from the group consisting of carboxylic acids and halides thereof containing at least four carbon atoms to form an ester linkage and with a member selected from the group consisting of sulphite and bisulphite salts to introduce a sulphonic group into the molecule.

11. The process of preparing chemical compounds which comprises reacting an aliphatic dicarboxylic acid amide of an alkylolamine, the dicarboxylic acid radical having not more than eight carbon atoms, with an acyl halide containing from eight to eighteen carbon atoms, to form an ester linkage and with a member selected from the group consisting of sulphite and bisulphite salts to introduce a sulphonic group into the molecule.

12. The process of preparing chemical compounds which comprises reacting maleic anhydride with monoethanolamine to form an amide thereof, and then reacting said amide, in optional order, with a fatty acid acyl halide containing from eight to eighteen carbon atoms to form an ester linkage and with an alkali bisulphite to introduce a sulphonic group at the double bond of the maleic acid radical.

13. The process of preparing chemical compounds which comprises reacting an alkylol non-tertiary amine with a member selected from the group consisting of unsaturated aliphatic dicarboxylic acids and anhydrides thereof to form amides of said alkylol non-tertiary amine, and then reacting said amides, in optional order, with a fatty acid acyl halide containing from eight to eighteen carbon atoms to form an ester linkage and with an alkali bisulphite to introduce a sulphonic group at a double bond of the dicarboxylic acid radical.

14. The process of preparing chemical compounds which comprises reacting an aliphatic halogeno-polycarboxylic acid amide of an alcohol amine with a member selected from the group consisting of carboxylic acids and halides thereof containing at least four carbon atoms to form an ester linkage and with a sulphite salt to replace halogen with a sulphonic group.

15. The process of preparing chemical compounds which comprises reacting an alkylol non-tertiary amine with a mono-ethyl ester of a dicarboxylic acid selected from the group consisting of maleic acid and fumaric acid, whereby an amide is formed, and then introducing, at opposite ends of the amide, a sulphonic group and a fatty acid radical containing from eight to eighteen carbon atoms.

16. The method of claim 15 wherein the alkylol non-tertiary amine comprises monoethanolamine.

17. The method of preparing chemical compounds which comprises reacting an ester of a member selected from the group consisting of aliphatic halogeno-poly-carboxylic acids and aliphatic unsaturated polycarboxylic acids, having not more than eight carbon atoms, with an alcohol non-tertiary amine to form an amide, and then introducing into the amide a sulphonic group and an organic radical selected from the group consisting of acyl, alkyl and substituted alkyl radicals containing at least four carbon atoms.

18. The method of preparing chemical compounds which comprises reacting a mono-ethyl ester of a member selected from the group consisting of maleic acid and fumaric acid, with an alkylol non-tertiary amine to form an amide, and then introducing into said amide a sulphonic group and a fatty acid radical containing from eight to eighteen carbon atoms.

19. The method of claim 12 wherein the sulphonic group is introduced into the molecule prior to the introduction of the fatty acid radical.

20. The method of claim 18 wherein the alkylol non-tertiary amine comprises diethanolamine.

MORRIS KATZMAN.